United States Patent
Kato

(12) 
(10) Patent No.: US 8,531,698 B2
(45) Date of Patent: Sep. 10, 2013

(54) INFORMATION PROCESSING APPARATUS, INFORMATION PROCESSING METHOD AND STORAGE MEDIUM THEREOF FOR GENERATING PRINT DATA FOR FORM DATA

(75) Inventor: Yutaka Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1209 days.

(21) Appl. No.: 12/236,908

(22) Filed: Sep. 24, 2008

(65) Prior Publication Data

US 2009/0086263 A1 Apr. 2, 2009

(30) Foreign Application Priority Data

Sep. 28, 2007 (JP) ................. 2007-254632

(51) Int. Cl.
*G06F 3/12* (2006.01)
*G06F 7/00* (2006.01)
*G06F 3/00* (2006.01)
*G06K 15/00* (2006.01)

(52) U.S. Cl.
USPC ..... 358/1.15; 358/1.18; 358/2.1; 358/426.02; 358/462; 715/224; 715/234

(58) Field of Classification Search
None
See application file for complete search history.

(56) References Cited

U.S. PATENT DOCUMENTS

| | | | |
|---|---|---|---|
| 6,189,113 B1 * | 2/2001 | Rabb et al. | 714/20 |
| 6,353,851 B1 * | 3/2002 | Anupam et al. | 709/204 |
| 2006/0004816 A1 * | 1/2006 | Diewald et al. | 707/101 |
| 2006/0112329 A1 * | 5/2006 | Collie et al. | 715/513 |
| 2007/0299743 A1 * | 12/2007 | Staib et al. | 705/27 |
| 2008/0262940 A1 * | 10/2008 | Kovach | 705/26 |

FOREIGN PATENT DOCUMENTS

| | | |
|---|---|---|
| JP | 6-332928 | 2/1994 |
| JP | 2003-173303 | 6/2003 |
| JP | 2005-235108 | 9/2005 |
| JP | 2006-171896 | 6/2006 |

OTHER PUBLICATIONS

Japanese Official Notice of Rejection dated Oct. 2, 2009, regarding Application No. 2007-254632.
Japanese Office Action issued in the counterpart application No. 2007-254632 dated Mar. 30, 2010 along with its English language translation—6 pages.

* cited by examiner

*Primary Examiner* — Thomas Lett
(74) *Attorney, Agent, or Firm* — Fitzpatrick, Cella, Harper & Scinto

(57) ABSTRACT

An object is to reduce a document generating time period of a form or the like, and to generate an appropriate document having correct calculation results even if it is necessary to calculate the aggregate of calculation target data extending over a plurality of pages. To achieve the object, the information processing apparatus is a system for generating a form by filling a plurality of insertion data into a template, which has a requesting unit configured to request one or more other apparatuses to execute processing of filling part of the plurality of insertion data into the template, wherein the requesting unit decides, according to the difference between two consecutive insertion data in the plurality of insertion data, the part of the insertion data the one or more other apparatuses are requested to fill into the template.

3 Claims, 11 Drawing Sheets

```
TOKYO  BRANCH, 300
TOKYO  BRANCH, 400
TOKYO  BRANCH, 500
TOKYO  BRANCH, 600
¥x0c
OSAKA  BRANCH, 100
OSAKA  BRANCH, 100
   :
```

FIG.6

INFORMATION PROCESSING APPARATUS, INFORMATION PROCESSING METHOD AND STORAGE MEDIUM THEREOF FOR GENERATING PRINT DATA FOR FORM DATA

BACKGROUND OF THE INVENTION

1. Field of the Invention

The present invention relates to a technique of reducing document generating time period for printing by a printing apparatus.

2. Description of the Related Art

Conventionally, there is a technique that generates document data in a prescribed format when printing a document by a printing apparatus, and performs printing thereof. For example, printing of a form is carried out through the following two-step procedure.

First, a form is generated by dynamically inserting real data (referred to as "insertion data" from now on) such as a company name and a sum of money into a form template including predefined ruled lines and a logotype. This is generating processing of a document.

Next, the generated form is printed by a printing apparatus. This is printing processing of the document. The generating processing of a document does not include the printing processing. Thus, the generating processing of a document and the printing processing are processing separate from each other.

Generally, the document generating processing such as that of a form is put under heavy load and takes a long time. A major cause thereof is that composing processing places a heavy load. The term "composing processing" means processing of calculating positions of individual characters in character strings according to font information and placing them. Thus, the document generation takes a long time, thereby offering a problem of requiring a long time for a user to obtain a desired printed matter.

To solve the problem, a technique of dividing and generating a document on a page by page basis is common conventionally as the processing of reducing the document generating time period (see Japanese Patent Laid-Open No. 2005-235108, for example). The technique of dividing and generating the document on a page by page basis reduces the generating time period of the document by the following processing. More specifically, it divides the insertion data on a page by page basis, transmits the divided insertion data to a plurality of document generating servers or processing apparatuses such as printing apparatuses, and shares the generating processing of the documents among the processing apparatuses. Then, the documents generated by the processing apparatuses are brought together to a particular processing apparatus so that the particular processing apparatus combines the documents, thereby reducing the generating time period of the document.

The foregoing conventional technique, however, divides the insertion data on a page by page basis. Thus, depending on the dividing position, a desired document cannot be generated sometimes. For example, consider a case that generates a document by assigning page 1 to a processing apparatus A and page 2 to a processing apparatus B, and that requires the page 2 following the dividing portion to display the aggregate of sums through the page 1 before the dividing portion and the page 2 by calculating it. In this case, since the processing apparatus B for generating page 2 does not have the sum data on page 1, it cannot calculate the aggregate, thereby offering a problem of being unable to generate the document correctly.

SUMMARY OF THE INVENTION

It is therefore an object of the present invention to solve the foregoing problem. To solve the foregoing problem, the present invention has the following configurations.

In the first aspect of the present invention, there is provided an information processing apparatus for generating a form by filling a plurality of insertion data into a template, the information processing apparatus comprising: a requesting unit configured to request one or more other apparatuses to execute processing of filling part of the plurality of insertion data into the template, wherein the requesting unit decides, according to difference between two consecutive insertion data in the plurality of insertion data, the part of the insertion data which the one or more other apparatuses are requested to fill into the template.

In the second aspect of the present invention, there is provided an information processing method of causing a computer to generate a form by filling a plurality of insertion data into a template, the information processing method comprising: a step of requesting one or more other apparatuses to execute processing of filling part of the plurality of insertion data into the template, wherein the step of requesting decides, according to difference between two consecutive insertion data in the plurality of insertion data, the part of the insertion data which the one or more other apparatuses are requested to fill into the template.

In the third aspect of the present invention, there is provided a computer program for generating a form by filling a plurality of insertion data into a template, the computer program comprising: a step of requesting one or more other apparatuses to execute processing of filling part of the plurality of insertion data into the template, wherein the step of requesting decides, according to difference between two consecutive insertion data in the plurality of insertion data, the part of the insertion data which the one or more other apparatuses are requested to fill into the template.

In addition, the individual steps in each image processing method in the foregoing information processing apparatus can be configured in the form of a program to be executed by a computer. Then, it is possible to cause the computer to execute the method by causing the computer to read the program. In addition, as for the program, it is possible to cause the computer to read it via a computer readable storage medium that records it.

Furthermore, an aspect in accordance with the present invention includes an image forming apparatus such as a printer having the information processing apparatus with the functions of the present invention as a control means.

According to the present invention, it becomes possible to reduce the document generating time period of a form or the like, and to improve the user's convenience. Besides, even if calculation is necessary of the aggregate of the calculation target data extending over a plurality of pages, it becomes possible to always generate an appropriate document by performing correct calculations by automatically making a decision as to whether the calculation is necessary or not and by making the division based on a result of the decision.

Further features of the present invention will become apparent from the following description of exemplary embodiments (with reference to the attached drawings).

BRIEF DESCRIPTION OF THE DRAWINGS

FIG. 6 is a diagram showing an example of insertion data to which a delimiting flag has been inserted in the embodiment 1 in accordance with the present invention;

DESCRIPTION OF THE EMBODIMENTS

[Embodiment 1]

Figure 1:
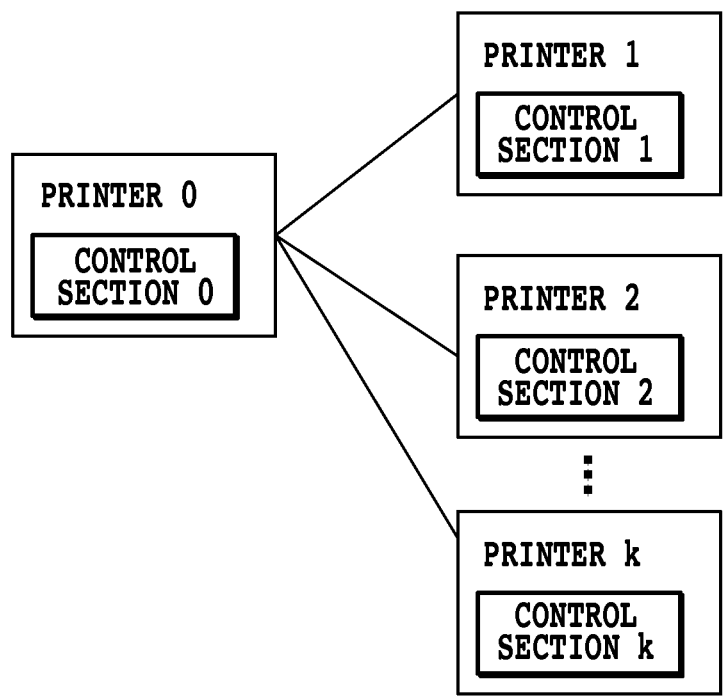
FIG. 1 is a block diagram showing a configuration of hardware for implementing the present invention.

FIG. 1 is a block diagram showing a configuration of hardware for implementing the present invention.

Printer 0-printer k are connected via a network, thus constituting an information processing system which enables the printers to communicate with each other. Each printer has a control section (information processing apparatus) for controlling communication in a main body, a peripheral unit and the network. The control section includes a CPU, memory and the like. A program for implementing the present invention is stored in the memory of the control section, and is executed after being loaded on the CPU of the control section.

Figure 2:
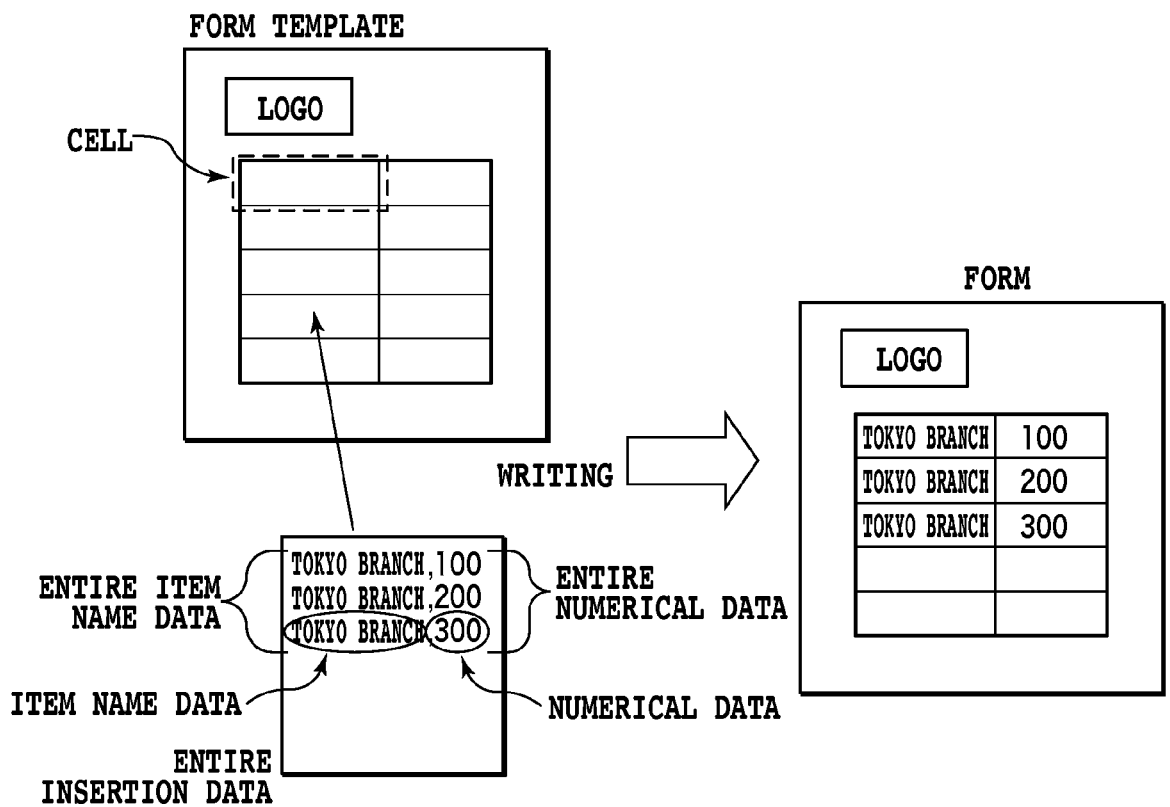
FIG. 2 is a schematic diagram showing an example of form generating processing.

FIG. 2 is a schematic diagram showing an example of the form generating processing.

A form template is filled with entire insertion data to generate a form. The form template defines only prescribed elements such as ruled lines of the table and a logotype. Each frame surrounded by the ruled lines of the table is referred to as a cell.

The entire insertion data consists of entire item name data and entire numerical data. The entire numerical data are a collection of data (numerical data) representing numerical values such as sums of money. The entire item name data is a collection of data (item name data) representing item names such as "Tokyo Branch" associated with the numerical data. The form is generated by filling the form template with the item name data and the numerical data corresponding to the individual cells.

Figure 3:
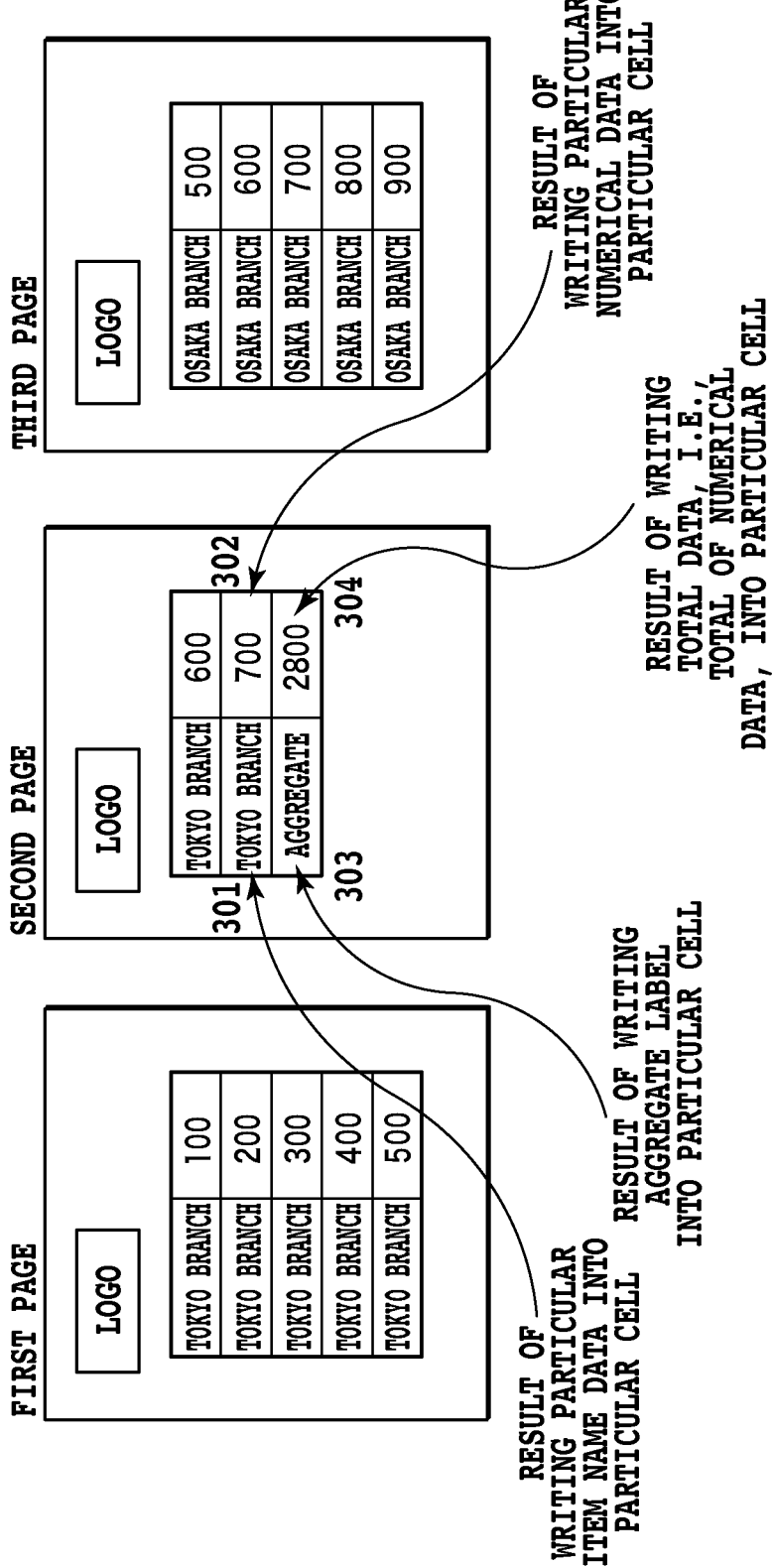
FIG. 3 is a schematic diagram showing an example of a generated form.

FIG. 3 is a schematic diagram showing an example of the form generated.

The form consists of three pages as a whole, and an aggregate result is output on the second page. The reference numeral 301 designates a result of filling a cell with particular item name data. The reference numeral 302 designates a result of filling a cell with particular numerical data. The reference numeral 303 designates a result of filling a cell with an aggregate label as the item name data. The reference numeral 304 designates a result of filling a cell with total data indicating the total of a certain type of numerical data.

The conventional technique divides the pages between the first page and the second page so that when the form generation is shared among the respective processing apparatuses, the processing apparatuses, to which the generation of the second page and forward is assigned, cannot calculate the total data. This is because the processing apparatuses, to which the generation of the second page and forward is allotted, do not have information on the numerical data to be filled into the cells on the first page.

Here, the processing at the time when the form generating processing is shared among the plurality of printers, that is, when the printer 0 requests other printers to perform the form generating processing, will be described in detail.

Figure 4:
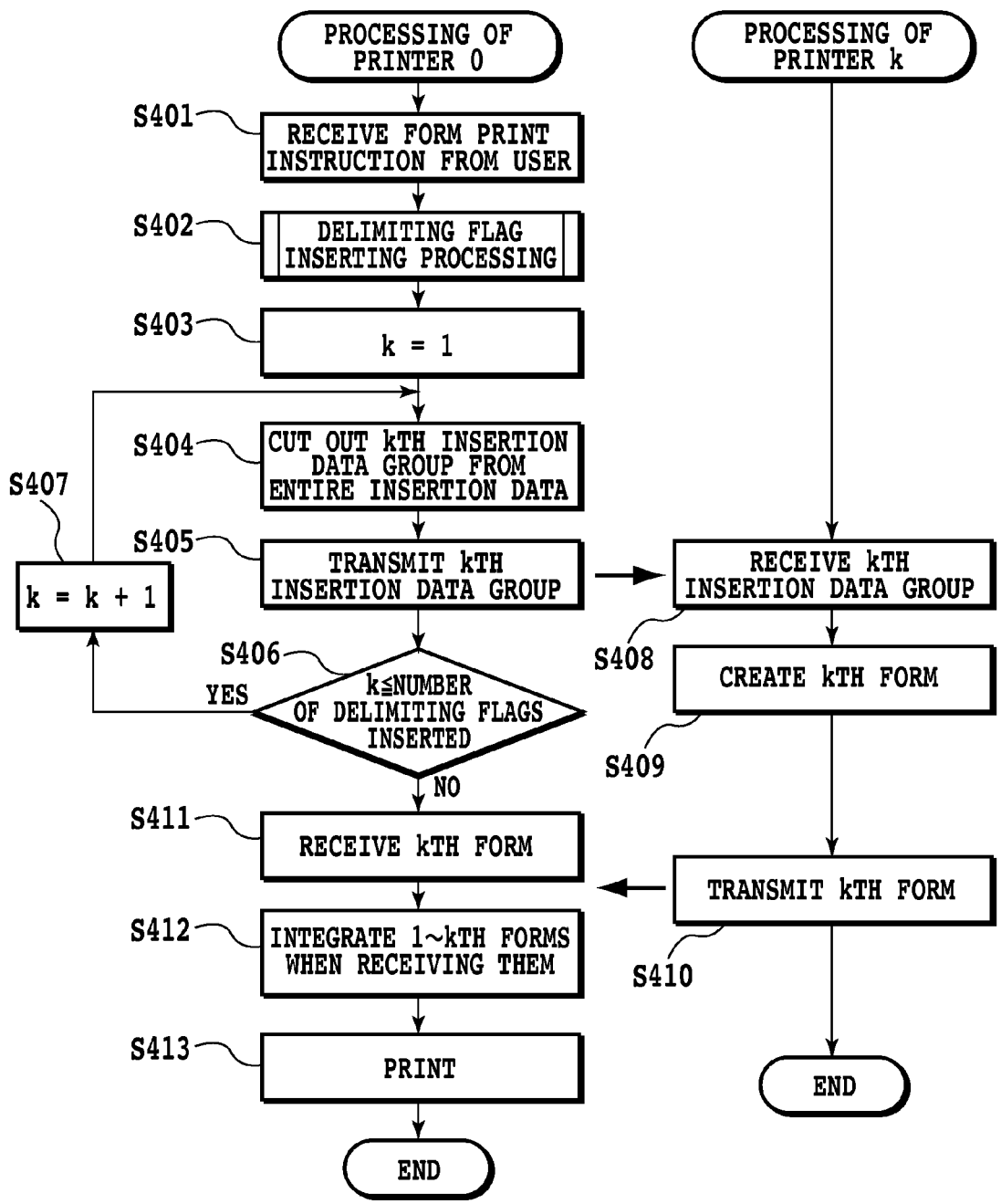
FIG. 4 is a flowchart showing a flow of processing when sharing form generating processing among a plurality of printers in an embodiment 1 in accordance with the present invention.

FIG. 4 is a flowchart showing a flow of the processing. Although FIG. 4 shows the flow of the processing of a particular printer k, a plurality of printers k can exist.

First, at step S401, the printer 0 accepts a print instruction of the form from a user.

Subsequently, at step S402, the printer 0 executes delimiting flag inserting processing. Details of the delimiting flag inserting processing will be described later with reference to FIG. 5.

Next, at step S403, the printer 0 substitutes "1" for the variable k. The variable k is a counter for controlling how many divisions the entire insertion data is divided into.

After that, the printer 0 and the printer k execute the processing in parallel. The printer 0 executes insertion data group cutout processing and printing processing, and the printer k executes the form generating processing.

First, the insertion data group cutout processing in the printer 0 will be described.

First, at step S404, according to the delimiting flag inserted in the delimiting flag inserting processing at step S402, the printer 0 cuts out a kth insertion data group from the entire insertion data.

Subsequently, at step S405, the printer 0 transmits the kth insertion data group cut out at step S404 to the printer k.

Next, at step S406, the printer 0 makes a decision as to whether the value of the variable k is equal to or less than the number of the inserted delimiting flags. The number of the inserted delimiting flags is a value calculated in the delimiting flag inserting processing at step S402, and indicates the number of the delimiting flags inserted into the entire insertion data. When the decision is made that the variable k is equal to or less than the number of the inserted delimiting flags, it is decided that an insertion data group to be cut out still remains in the entire insertion data, and the processing proceeds to step S407. In contrast, when the decision is made that the variable k is greater than the number of the inserted delimiting flags, it is decided that no insertion data group to be cut out is left in the entire insertion data, and the processing proceeds to step S411.

As described above, when the decision is made that the variable k is equal to or less than the number of the inserted delimiting flags at step S406, the processing proceeds to step S407 at which the printer 0 adds "1" to the variable k. After that, the processing returns to the processing at step S404, again.

The foregoing is the insertion data group cutout processing in the printer 0.

Next, the form generating processing in the printer k will be described.

First, at step S408, the printer k receives the kth insertion data group transmitted from the printer 0 at step S405.

Subsequently, at step S409, the printer k fills the form template with the kth insertion data group received at step S408, thereby generating the kth form.

Next, at step S410, the printer k transmits the kth form data generated at step S409 to the printer 0.

The foregoing is the form generating processing in the printer k. Incidentally, although FIG. 4 shows an example in which the printer k different from the printer 0 executes the form generating processing, the printer 0 can also perform the form generating processing on part of the cut out insertion data group.

Next, the printing processing in the printer 0 will be described.

At the foregoing step S406, when the decision is made that the variable k is greater than the number of the inserted delimiting flags, the processing proceeds to step S411 as described before. At this step 411, the printer 0 receives the kth form data transmitted from the printer k at step S410.

Subsequently, at step S412, if the printer 0 receives the complete form data from first to kth form data at step S411, the printer 0 integrates the form data to one form.

Next, at step S413, the printer 0 prints out the form formed into a unity by the integration at step S412.

The foregoing is the printing processing in the printer 0.

As described above, the insertion data group cutout processing, the form generating processing, and the printing processing are executed, and the operation up to the form printing is completed.

Here, the delimiting flag inserting processing at the foregoing step S402 will be described in detail with reference to FIG. 5.

Figure 5:
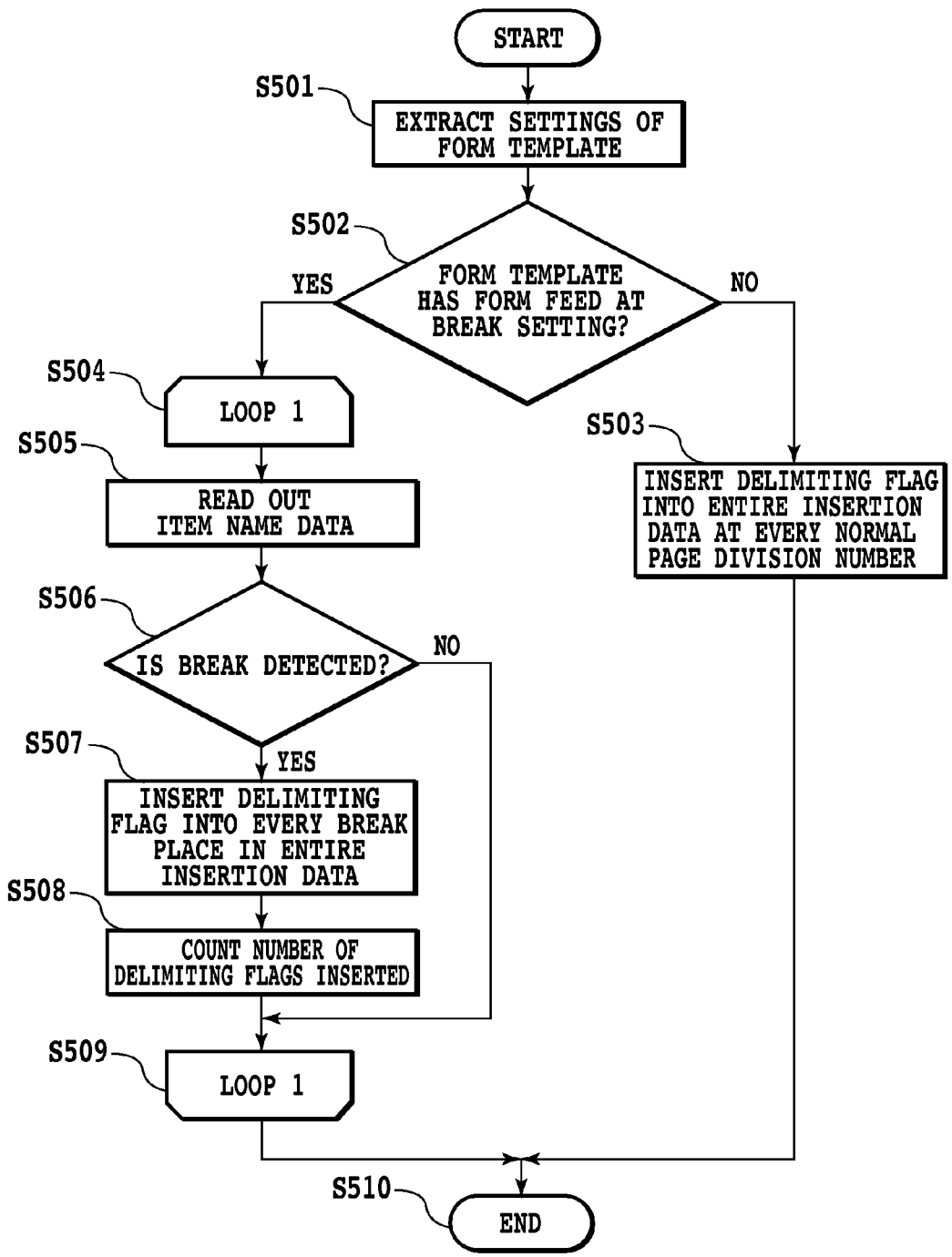
FIG. 5 is a flowchart showing a flow of delimiting flag inserting processing in the embodiment 1 in accordance with the present invention.

FIG. 5 is a flowchart showing a flow of the delimiting flag inserting processing at step S402 in FIG. 4.

First, at step S501, the printer 0 extracts settings made in the form template.

Subsequently, at step S502, the printer 0 makes a decision as to whether the form template has a form feed at break setting. The term "form feed at break setting" refers to a setting that provides, when detected that particular item name data differs from the previous item name data, that the particular item name data be filled into a cell on a page different from the page of the previous item name data.

Next, unless a decision is made at step S502 that the form feed at break setting is made, the printer 0 inserts the delimiting flag into the entire insertion data at every normal page division number at step S503. Here, the term "normal page division number" refers to the default page division number setting when no form feed at break setting is made. For example, when the page division number is five, the entire insertion data is divided at every five pages. As for the setting of the normal page division number, it can be defined in advance for each form template or for the entire form system, or can be provided dynamically at the form generation. At step S503, if the delimiting flag is inserted at every normal page division interval, the processing proceeds to step S510 to complete the delimiting flag inserting processing.

On the other hand, if a decision is made at step S502 that the form feed at break setting is made, the printer 0 checks each item name data in the entire insertion data, and starts loop processing for inserting the delimiting flag into the following break places at step S504. The loop processing from step S504 to step S509 is executed repeatedly until the entire insertion data undergo the loop processing.

First, at step S505, in the first loop, the first item name data is read out of the entire insertion data. In the second and subsequent loop of the loop processing, it is assumed that the next item name data is read every time the loop processing is repeated.

Next, at step S506, the printer 0 makes a decision as to whether a break is detected from the item name data read out at step S505. Here, the term "break" means that the particular item name data differs from the consecutive previous item name data. In addition, if it is found that the particular item name data differs from the previous item name data, the particular item name data is called post-break item name data, and the previous item name data is called pre-break item name data. Incidentally, since the initial item name data has no previous item name data, the initial item name data is assumed not to become the post-break item name data. In addition, it is assumed that the item name data read out immediately before the item name data read out at this time at step S505 is stored temporarily to be used for break detection.

Although the break detection is performed as described above, unless a break is detected at step S506, the printer 0 returns to step S504 to execute the loop processing continuously.

On the other hand, when a break is detected at step S506, the printer 0 inserts at step S507 the delimiting flag into the break place detected in the entire insertion data. The term "break place" means the location between the pre-break item name data and the post-break item name data.

Subsequently, at step S508, the printer 0 counts the inserted number of the delimiting flags. The counting can be achieved by adding one to a variable reserved on a memory every time the delimiting flag is inserted at step S507, for example.

Next, at step S509, the printer 0 returns the processing to step S504 to carry out analysis of each item data continuously.

When the delimiting flag insertion into the entire insertion data has been completed as described above, the printer 0 passes through the loop from step S504 to step S509, and proceeds to step S510.

Then at step S510, the delimiting flag inserting processing is completed.

Here, FIG. 6 shows an example of the entire insertion data after inserting the delimiting flag through the delimiting flag inserting processing shown in FIG. 5. In the example, a unique symbol "¥x0c" denotes the delimiting flag.

As described above, the delimiting flag is inserted into the break places. Accordingly, the cutout place of the insertion data at the foregoing step S404 is determined by the inserted delimiting flag so that from the post-break item name data to the next pre-break item name data are cut out as a group. In this way, inserting the delimiting flag into the break places makes it possible to circumvent the problem of being unable to calculate the total data as described before, and to reduce the form generating processing by the distributed processing.

[Embodiment 2]

The foregoing embodiment 1 is described by way of example that actually divides (cuts out) the entire insertion data, and transmits only necessary portions to the individual processing apparatuses, thereby reducing the generating processing time of the document. The embodiment 1, however, can sometimes have a problem. The problem takes place, for example, when breaks occur at subtotals (sums of sales of respective branch offices, for example), and the calculation of the total is necessary in the last page. In this case, if the cutting out is performed according to the delimiting flags inserted into the break places at the subtotals, the total on the final page cannot be calculated. The same goes for the case where it is necessary to calculate the total of several subtotals over the break places such as an interim total besides the total. The present embodiment 2 is an example capable of solving the foregoing problem.

More specifically, although the foregoing embodiment 1 cuts out the insertion data groups in the necessary portions from the entire insertion data and transmits the insertion data groups, the present embodiment transmits the entire insertion data without change. This is a feature of the present embodiment. Accordingly, the cutout processing at step S404 of the foregoing embodiment 1 is not performed in the present embodiment.

The hardware configuration of the present embodiment is the same as that of the foregoing embodiment 1. In the following, referring to FIG. 7, a flow of the processing when the plurality of printers in the present embodiment share the form generating processing will be described only about different portions while omitting the same portions as those of the processing of the foregoing embodiment 1 shown in FIG. 4.

Figure 7:
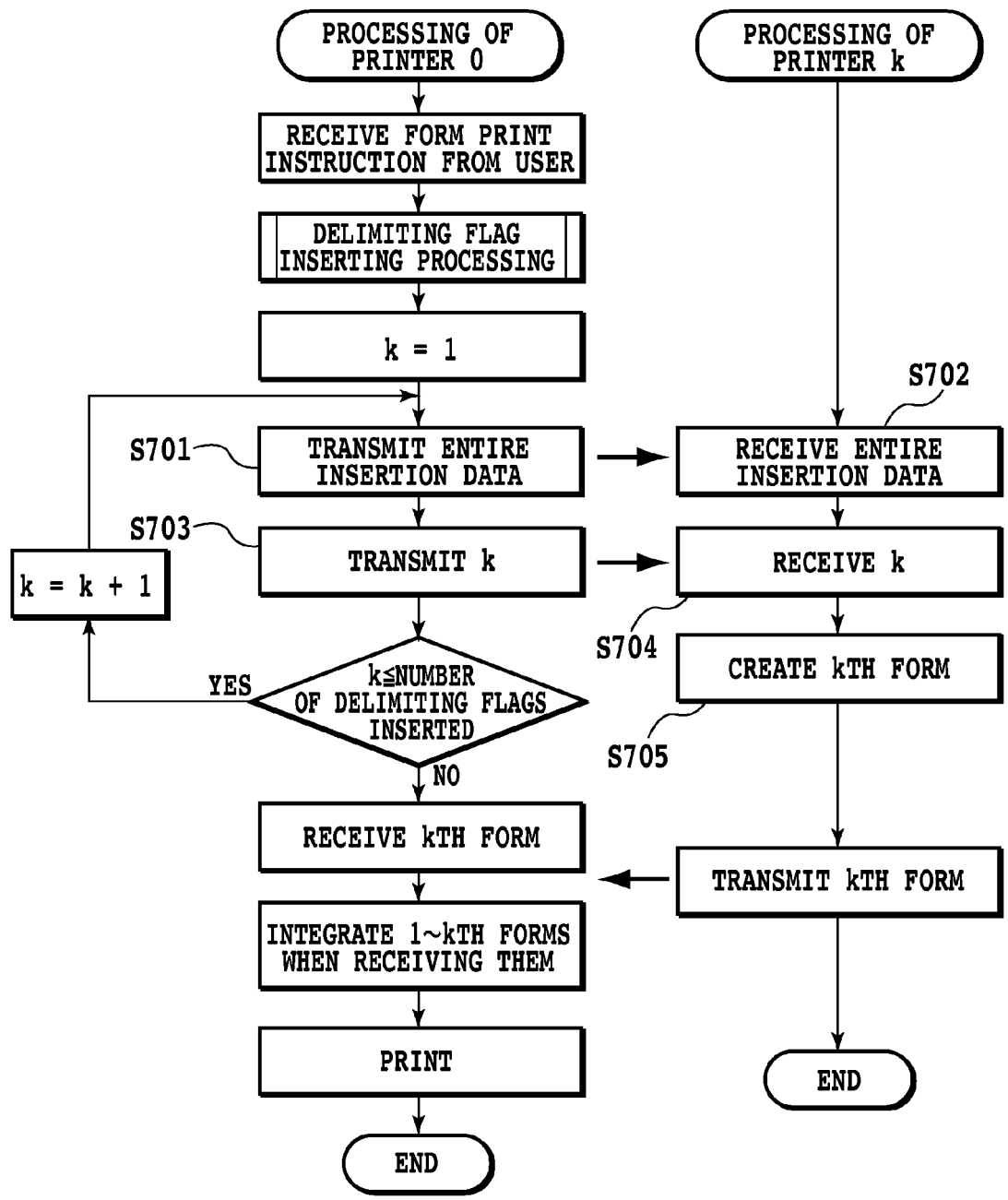
FIG. 7 is a flowchart showing a flow of processing when sharing form generating processing among a plurality of printers in an embodiment 2 in accordance with the present invention.

FIG. 7 is a flowchart showing a flow of the processing in the present embodiment.

At step S701, the printer 0 transmits to the printer k the entire insertion data having completed the delimiting flag insertion.

At step S702, the printer k receives the entire insertion data transmitted at step S701.

At step S703, the printer 0 transmits the variable k to the printer k.

At step S704, the printer k receives the variable k transmitted at step S703. As for the sequence of the transmission/reception of the entire insertion data and the variable k, either of them can be first.

Subsequently, at step S705, the printer k generates the kth form from the information about the entire insertion data received at step S702 and about the variable k received at step S704. The variable k indicates the location (where is it from the top) of the insertion data to be filled into the kth form the printer k takes charge of generating. Thus, the variable k is allotted place information indicating the place assigned to the printer k. Here, the printer, which takes charge of generating the form of a page including the total or the interim total, extracts necessary data from the received entire insertion data, and calculates the total or the interim total.

As described above, the printer 0 transmits to other processing apparatuses the variable k, which is the information for identifying the place of the insertion data group to be used for the document generation, rather than actually dividing the entire insertion data. This makes it possible to create such a complicated form as the total appears on the final page appropriately. In addition, the distributed processing can reduce the time period of the form generating processing.

As a variation of the present embodiment, a configuration is also possible which divides the entire insertion data into two parts at the time of transmitting the entire insertion data, and transmits them one by one. In this case, more specifically, the printer 0 transmits to the printer k data group B which consists of the insertion data to be filled into the kth form assigned to the printer k and the insertion data subsequent thereto. After that, the printer 0 transmits to the printer k data group A which is previous to the insertion data to be filled into the kth form, thereby transmitting the entire insertion data to the printer k. In other words, the printer 0 transmits the data group B first, which includes the data with which the printer k, the receiver, fills the template. According to the method, since the data with which the printer k fills the template are present between the top of the data group B transmitted first from the printer 0 and the next break, the printer k can start filling the insertion data into the template by using the data before completing the reception of the entire insertion data. In addition, the transmission and reception of the variable k, the allotted place information, at step S703 and S704 can be omitted in this example. Accordingly, the variation can further reduce the form generating processing time.

[Embodiment 3]

In the foregoing embodiment 1 and embodiment 2, if a break is detected, the delimiting flag is always inserted, and the form generation is shared among the respective processing apparatus. However, when the amount of the form to be generated by the individual processing apparatuses is small (one page, for example), it is conceivable that the time required for the cutout processing and the transmitting processing of the entire insertion data becomes greater so that the completion of the form generating processing is retarded as a consequence. The present embodiment 3 is implemented to solve the problem.

The hardware configuration of the present embodiment is the same as that of the foregoing embodiment 1. In the following, the delimiting flag inserting processing in the present embodiment will be described only about portions different from those of the processing in the foregoing embodiment 1 shown in FIG. 5 while omitting the description of the same portions.

Figure 8:
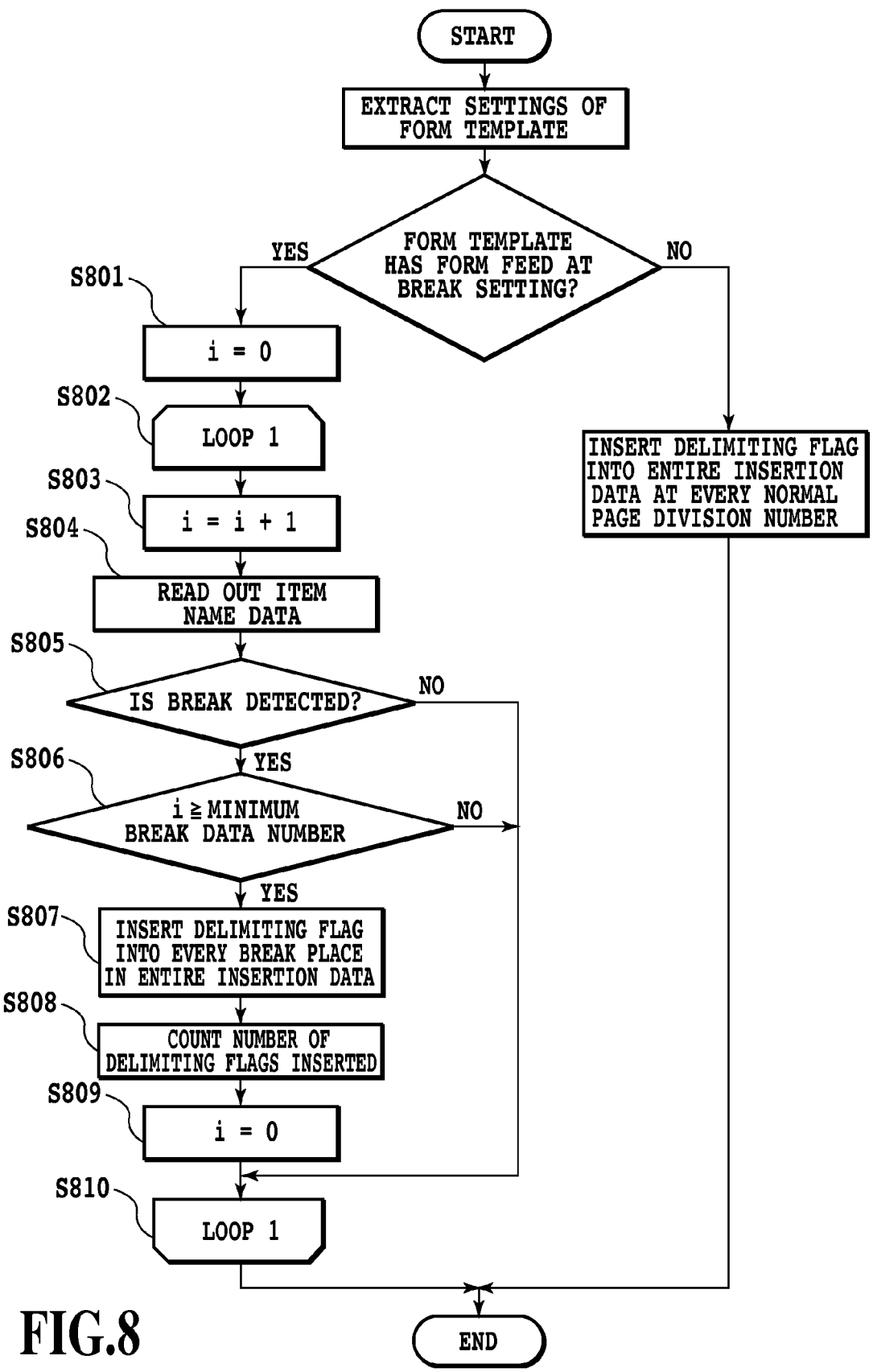
FIG. 8 is a flowchart showing a flow of delimiting flag inserting processing in an embodiment 3 in accordance with the present invention.

FIG. 8 is a flowchart showing a flow of the delimiting flag inserting processing in the present embodiment 3.

At step S801, the printer 0 substitutes "0" for the variable i. The variable i is a counter for counting the number of the item name data.

Subsequently, when entering the loop processing from step S802, the printer 0 adds "1" to the variable i at step S803. The processing is executed once every time the analysis loop of the item name data takes a turn (that is, every time one of the item data is read).

If a break is detected at step S805, the printer 0 makes a decision at step S806 as to whether the variable i is equal to or greater than "the minimum break data number". Here, the term "the minimum break data number" refers to the minimum value of the number of the item name data within a certain break range required for the insertion of the delimiting flag. If the number of the item name data in the certain break range is less than the minimum break data number, the delimiting flag is not inserted even if a break occurs. Here, the term "break range" refers to the range from a particular break place to the next break place.

If it makes a decision at step S806 that the variable i is less than the minimum break data number, the printer 0 returns to step S802 to execute the loop processing continuously.

On the other hand, if it makes a decision at step S806 that the variable i is equal to or greater than the minimum break data number, the printer 0 proceeds to step S807, at which the printer 0 inserts the delimiting flag into the break place detected in the entire insertion data.

Subsequently, at step S808, the printer 0 counts the number of the inserted delimiting flags. The counting can be achieved by adding "1" to a variable reserved on the memory every time the delimiting flag is inserted at step S807, for example.

Next, at step S809, the variable i is initialized to zero.

Then, at step S810, the printer 0 returns its processing to step S802 to execute the loop processing continuously. The remaining processing is the same as that of the foregoing embodiment 1.

As described above, providing a limit called "the minimum break data number" makes it possible to prevent the form generation from being shared when the number of the pages is too low, and as a result to prevent the delay of the form printing processing.

The foregoing was the description of the details of the embodiment 3 in accordance with the present invention.

[Embodiment 4]

Figure 9:
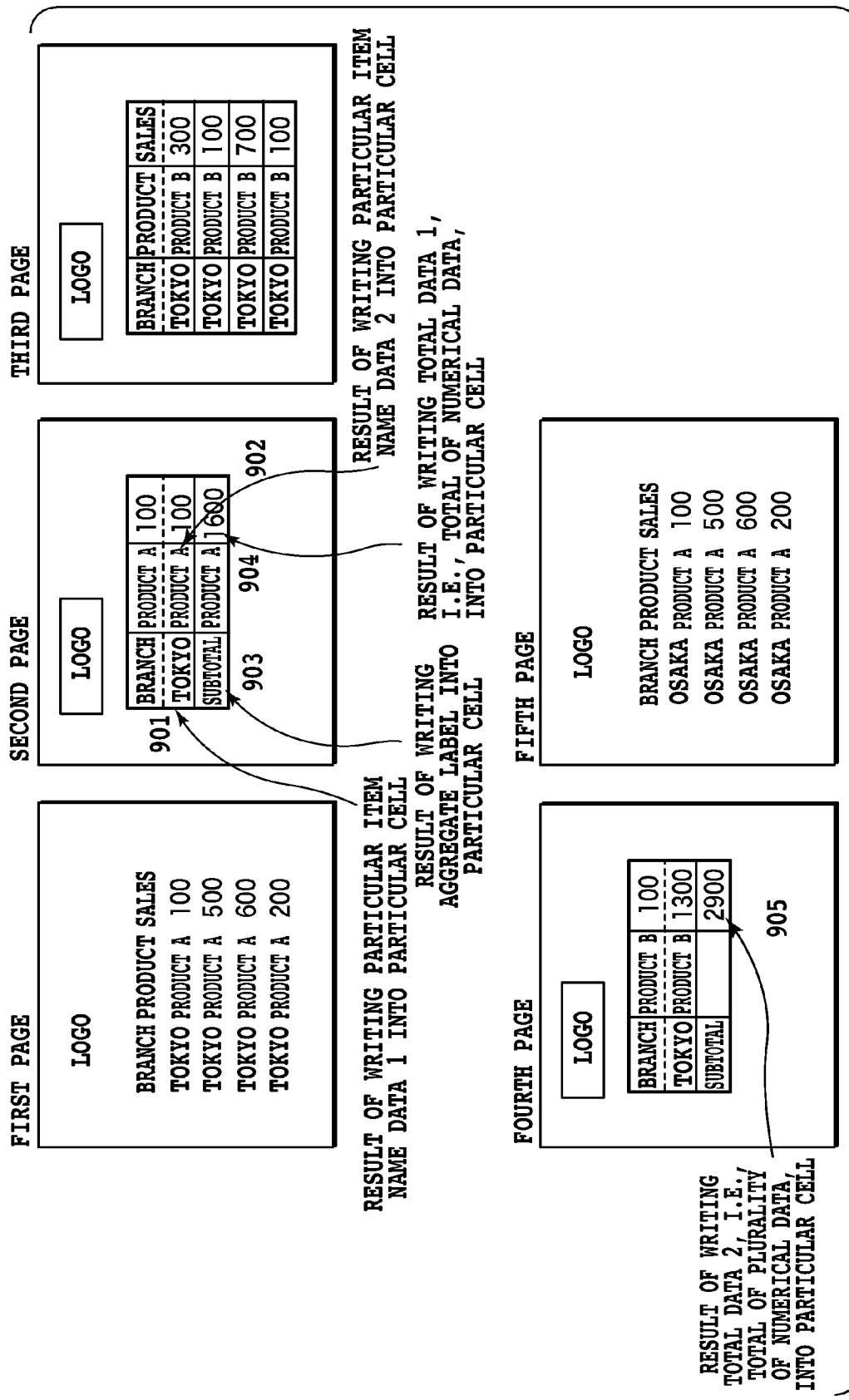
FIG. 9 is a diagram showing an example of a generated form in an embodiment 4 in accordance with the present invention.

The present embodiment is an example in which a multistage break occurs. The term "multistage break" refers to the occurrence of a plurality of breaks hierarchically. FIG. 9 is an example of a form in which the multistage break occurs.

In FIG. 9, the reference numeral 901 designates a result of filling a cell with particular item name data 1. The term "item name data 1" here is a branch office name such as "Tokyo" or "Osaka".

The reference numeral 902 designates a result of filling a cell with particular item name data 2. The term "item name data 2" here is a product name such as "product A" or "product B".

The reference numeral 903 designates a result of filling a cell with a subtotal label as the item name data.

The reference numeral 904 designates a result of filling a cell with the total data 1, which is the total of a certain kind of numerical data. The total data 1 is the total of the sales of the product A. When the item name data 2 changes from "product A" to "product B", a break occurs, and the subtotal label and the total data 1 are filled as designated by the reference numeral 904.

The reference numeral 905 designates a result of filling a cell with the total data 2, which is the total of a certain kind of numerical data. The total data 2 is the total of the sales of the Tokyo branch. When the item name data 1 changes from "Tokyo" to "Osaka", a break occurs, and the aggregate label and the total data 2 are filled as designated by the reference numeral 905.

In this way, when the form is generated, a plurality of breaks can sometimes occur in a multistage manner. The break range of the break (break of the aggregate) that occurs when the item name data 1 is switched is broader than the break range of the break (break of the subtotal) that occurs when the item name data 2 is switched. When comparing the breaks, if one break has a break range broader than the other, it is denoted that the break level is higher (higher level). In contrast, if one break has a break range narrower than the other, it is denoted that the break level is lower (lower level). For example, the first break (the break of the subtotal) described in FIG. 9 is defined as a break level 1, and the second break (the break of the aggregate) is defined as a break level 2.

The hardware configuration of the present embodiment is the same as that of the foregoing embodiment 1. In the following, as for the delimiting flag inserting processing in the present embodiment, only different portions will be described while omitting the same portions as those of the processing of the foregoing embodiment 1 shown in FIG. 5.

Figure 10:
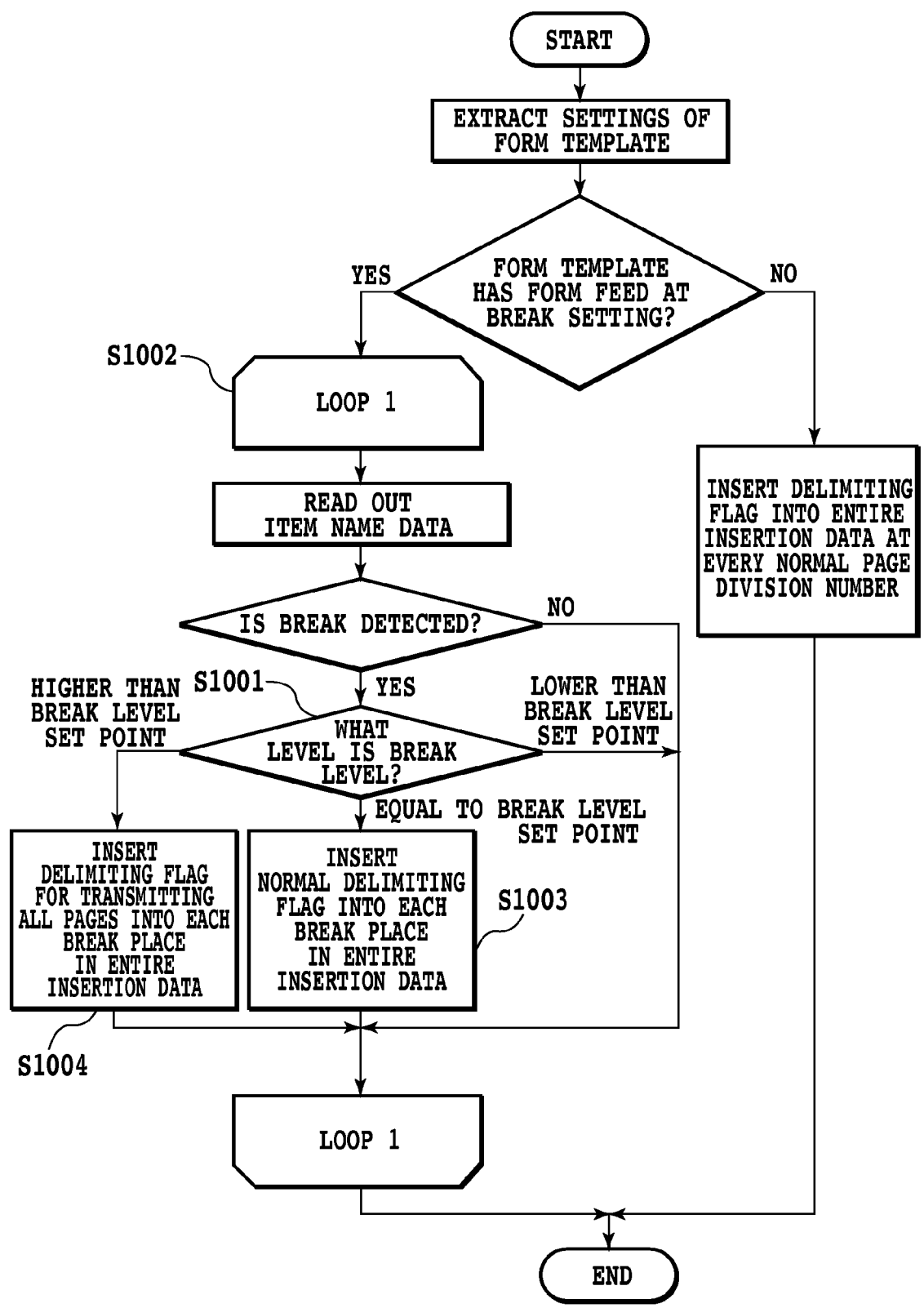
FIG. 10 is a flowchart showing a flow of delimiting flag inserting processing in an embodiment 4 in accordance with the present invention.

FIG. 10 is a flowchart showing a flow of the delimiting flag inserting processing in the present embodiment.

At step S1001, the printer 0 causes the processing to branch in accordance with the break level with respect to a value of a dividing break level setting. Here, the term "dividing break level setting" refers to a setting value of the break level for making a decision of adopting the form generation sharing method by actually dividing (cutting out) the entire insertion data as described in the foregoing embodiment 1.

When the decision is made at step S1001 that the break level is lower than the dividing break level setting value, the printer 0 returns to the starting point of the loop processing at step S1002 without inserting the delimiting flag. For example, when the dividing break level setting value is "2", the printer 0 does not insert the delimiting flag for a break whose break level is equal to or less than "1".

On the other hand, when the decision is made at step S1001 that the break level is equal to the dividing break level setting value, the printer 0 proceeds to step S1003 to insert the normal delimiting flag into the break place detected in the entire insertion data. The term "normal delimiting flag" here indicates to employ the method of actually dividing (cutting out) and sharing the entire insertion data (embodiment 1), and uses a symbol such as "¥x0c".

On the other hand, if the decision is made at step S1001 that the break level is higher than the dividing break level setting value, the processing proceeds to step S1004. Then, at this step, the printer 0 inserts the delimiting flag for transmitting all the pages into the break places detected in the entire insertion data. The term "delimiting flag for transmitting all the pages" indicates to employ the method of transmitting and sharing the entire insertion data (embodiment 2), and uses a symbol such as "¥x0b".

The remaining processing is the same as that of the foregoing embodiment 1.

Next, a flow of the processing at the time of sharing the form generating processing in the present embodiment will be described with reference to FIG. 11.

Figure 11:
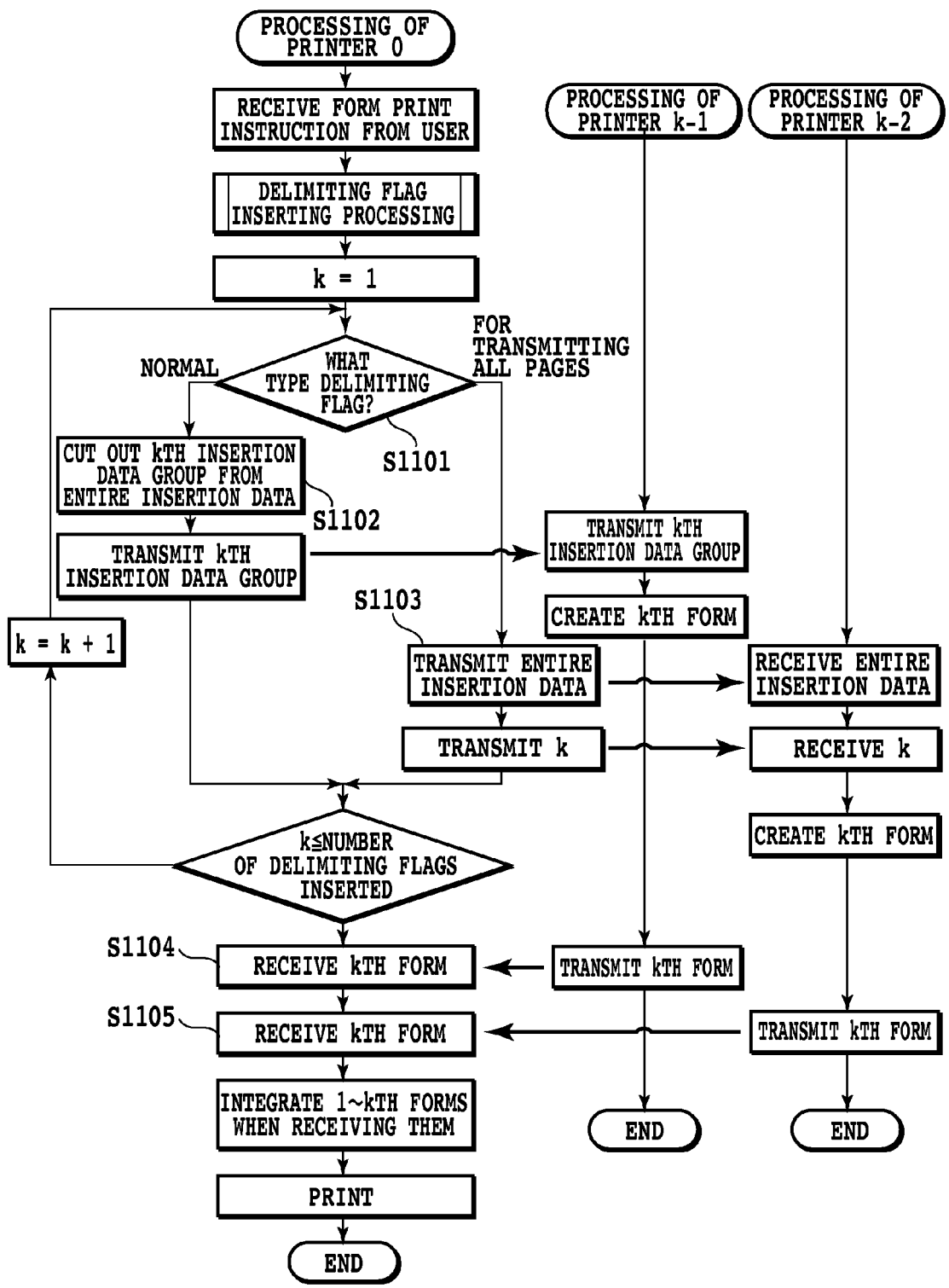
FIG. 11 is a flowchart showing a flow of processing when sharing form generating processing among a plurality of printers in the embodiment 4 in accordance with the present invention.

FIG. 11 is a flowchart showing a flow of the processing.

Since the present embodiment is a combination of the foregoing embodiment 1 and the embodiment 2, only different portions will be described below while omitting the same portions as those of the foregoing embodiment 1 and embodiment 2.

At step S1101 of FIG. 11, the printer 0 checks the type of the kth delimiting flag inserted into the entire insertion data.

If the decision is made at step S1101 that the type of the delimiting flag is "normal", the printer 0 and printer k-1 execute the shared processing of the form generation according to the method shown in the foregoing embodiment 1 at step S1102 and forward.

After that, at step S1104, the printer 0 receives the kth form generated by the printer k-1.

On the other hand, if the decision is made at step S1101 that the type of the delimiting flag is "for transmitting all the pages", the printer 0 and printer k-2 execute the shared processing of the form generation according to the method shown in the foregoing embodiment 2 at step S1103 and forward.

Then, at step S1105, the printer 0 receives the kth form generated by the printer k-2.

The remaining processing is the same as that of the foregoing embodiment 1 and that of the embodiment 2.

As described above, the present embodiment 4 can select the optimum sharing method by setting the break level, and create an appropriate form. In addition, it can reduce the form generating processing time by the distributed processing.

The foregoing is the detailed description of the embodiment 4 in accordance with the present invention.

Incidentally, the object of the present invention can be achieved by storing, into a storage medium, program code for implementing the procedures of the flowcharts shown in each foregoing embodiment, and by reading the program code from the storage medium and by executing it with a computer (or CPU or MPU) of the system or apparatus.

In this case, the program code itself read out of the storage medium causes the computer to implement the functions of the foregoing embodiments. Accordingly, the program code and the computer readable storage medium that stores the program code constitute one of the aspects of the present invention.

As the storage medium for supplying the program code, a floppy disk, hard disk, optical disk, magneto-optical disk, CD-ROM, CD-R, magnetic tape, nonvolatile memory card, ROM and the like can be used.

In addition, the functions of the foregoing embodiments are implemented by executing the read-out program with the computer. Besides, the term "execution of the program" includes the case where an OS and the like working on the computer perform part or all of the actual processing according to the instructions of the program.

Furthermore, the functions of each foregoing embodiment can also be implemented by a function expansion board inserted into a computer or a function expansion unit connected to the computer. In this case, the program read out of the storage medium is written into a memory in the expansion board inserted to the computer or into a memory in the expansion unit connected to the computer. After that, according to the instructions of the program, the CPU in the expansion board or in the expansion unit executes part or all of the actual processing. Such processing by the function expansion board or function expansion unit can also implement the functions of the foregoing embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-254632, filed Sep. 28, 2007, which is hereby incorporated by reference herein in its entirety.

What is claimed is:

1. An information processing apparatus for generating a form by filling a plurality of insertion data, each consisting of a piece of numerical data to be aggregated and a piece of item name data representing an item name of the piece of numerical data, into a template, said information processing apparatus comprising:
    a deciding unit configured to decide, according to a difference between the item names of two consecutive pieces of insertion data in the plurality of insertion data, a part of the insertion data for a device to fill into the template;
    a transmitting unit configured to transmit to the device the part of the insertion data to fill into the template;
    a receiving unit configured to receive data generated by filling the part of the insertion data into the template by the device; and
    an integrating unit configured to integrate data received by said receiving unit generated by a plurality of devices,
    wherein the deciding unit further comprises:
        a first deciding unit configured to decide whether the item names of the two consecutive pieces of insertion data differ from each other; and
        a second deciding unit configured to decide, in a case where the item names are decided as being different from each other by said first deciding unit, whether a number of pieces of insertion data which have not been transmitted up to the first of the two consecutive pieces of insertion data is equal to or greater than a predetermined number,
    wherein, in a case where the number of pieces of the insertion data is decided to be equal to or greater than the predetermined number by said second deciding unit, the insertion data which have not been transmitted up to the first of the two consecutive pieces of insertion data is decided as the part of the insertion data for the device to fill into the template.

2. An information processing method for an information processing apparatus for generating a form by filling a plurality of insertion data, each consisting of a piece of numerical data to be aggregated and a piece of item name data representing an item name of the piece of numerical data, into a template, the method comprising:
    a deciding step of deciding, according to a difference between the item names of two consecutive pieces of insertion data in the plurality of insertion data, a part of the insertion data for a device to fill into the template;
    a transmitting step of transmitting to the device the part of the insertion data to fill into the template;
    a receiving step of receiving data generated by filling the part of the insertion data into the template by the device; and
    an integrating step of integrating data received in said receiving step generated by a plurality of devices,
    wherein said deciding step further comprises:
        a first deciding step of deciding whether the item names of the two consecutive pieces of insertion data differ from each other; and
        a second deciding step of deciding, in a case where the item names are decided as being different from each other in said first deciding step, whether a number of pieces of insertion data which have not been transmitted up to the first of the two consecutive pieces of insertion data is equal to or greater than a predetermined number,
    wherein, in a case where the number of pieces of the insertion data is decided to be equal to or greater than the predetermined number in said second deciding step, the insertion data which have not been transmitted up to the first of the two consecutive pieces of insertion data is decided as the part of the insertion data for the device to fill into the template.

3. A non-transitory computer-readable storage medium storing an executable program for causing a computer to perform the information processing method according to claim 1.

* * * * *